United States Patent
Tang et al.

(10) Patent No.: US 7,669,485 B2
(45) Date of Patent: Mar. 2, 2010

(54) SYSTEM FOR SENSING AIR VELOCITY WITHOUT REQUIRING EXTERNAL POWER SUPPLY AND A METHOD FOR OPERATING THE SAME

(75) Inventors: Hsin-Dar Tang, Hsin Chu Hsien (TW); Bo-Yin Chu, Hsin Chu Hsien (TW); Wei-Chi Chen, Hsin Chu Hsien (TW)

(73) Assignee: Industrial Technology Research Institute (TW)

( * ) Notice: Subject to any disclaimer, the term of this patent is extended or adjusted under 35 U.S.C. 154(b) by 176 days.

(21) Appl. No.: 11/944,066

(22) Filed: Nov. 21, 2007

(65) Prior Publication Data

US 2008/0115587 A1 May 22, 2008

(30) Foreign Application Priority Data

Nov. 22, 2006 (TW) ............................... 95143151 A

(51) Int. Cl.
*G01F 1/05* (2006.01)
(52) U.S. Cl. ................................................. 73/861.79
(58) Field of Classification Search .............. 73/861.79, 73/861.78, 861.76; 600/538; 376/76
See application file for complete search history.

(56) References Cited

U.S. PATENT DOCUMENTS 6,629,934 B2 * 10/2003 Mault et al. ................. 600/538
7,209,407 B2 * 4/2007 Chamberlain ................ 367/76

* cited by examiner

*Primary Examiner*—Jewel Thompson
(74) *Attorney, Agent, or Firm*—Raymond J. Ho; Morris Manning & Martin

(57) ABSTRACT

An air velocity sensing system not requiring external power supply is applied to an air duct system, comprising: (1) a sensor module disposed in the air duct for measuring the air velocity therein and for saving the measured air velocity value; and (2) a control module for wirelessly transmitting a signal to the sensor module, which sends the measured air velocity value back to the control module after receiving the signal from the control module, so as to have the air velocity value displayed on control module. The present invention also provides an air velocity sensing method not requiring external power supply.

23 Claims, 7 Drawing Sheets

SYSTEM FOR SENSING AIR VELOCITY WITHOUT REQUIRING EXTERNAL POWER SUPPLY AND A METHOD FOR OPERATING THE SAME

BACKGROUND OF THE INVENTION

1. Field of the Invention

The present invention relates to a system and method for sensing air velocity without requiring external power supply; in particular, a system and method for sensing air velocity without requiring external power supply, aiming to simplify the condition inspection of the ventilation system.

2. Description of the Related Art

In an effort to ensure air quality in the working area, most companies or factories would install ventilation or exhaust systems. However, given the accessibility of the ventilation or exhaust systems, only few of them would further install monitoring systems to oversee the working condition of the ventilation system. Usually, companies or factories would use anemometers or smoke tubes to verify the efficacy of the ventilation system. However, due to many nagging problems involved in the existing checking procedure, many companies or factories have lacked the incentive to perform the efficacy check of the ventilation or exhaust systems in a way that matches up standard procedures.

To keep their employees in good health and to meet the demand of unique manufacturing process, almost all companies or factories would set up ventilation or exhaust systems to keep air moving, so that the employees would not have difficulty breathing. In addition to basic specifications set out for the installation of the ventilation system, laws and regulations also require that ventilation systems in certain workplaces be kept under specific working conditions, in terms of their minimum air exchange rate, minimum air velocity, and minimum negative pressure, etc. Even so, however, conventional factories still do not put these requirements into effective practice. What's more, frequent clogging and leaking in the air ducts also pose concerns for the ventilation systems. As a result, not only do ventilation systems have to be subject to immediate function tests upon installation, but, during the life cycle of the running system, condition inspections also have to be conducted on a regular basis. Some factories in the high-tech industry even put the ventilation system under round-the-clock monitoring. Most companies or factories opt for a regular fix-frequency monitoring method, as shown in FIG. 6 and FIG. 7. FIG. 6 shows a schematic view, where air velocity is measured in the air duct. To take the measurement, one has to rely on a climbing device such as a ladder or a box to be elevated to the extent that a Pitot tube can be inserted into an air duct 62 to take both the velocity pressure and the static pressure before these measurements are converted into an air velocity value to be shown on a display 63 for reading. Despite its potential to get more accurate data, this method remains taxing in terms of its accessibility.

FIG. 7 shows a schematic view, where a smoke tube is used to test the airflow in a fume hood. To begin with, the tester uses a smoke tube 71 to spray power into the fume hood 72. Interactions between the powder and the air would result in smog 73, whose dispersion direction would give the tester a rough idea about the airflow and the air velocity. However, the accuracy of this method is riding on the experience of the tester. For many of the factories, either method is demanding and requires professionalism. Therefore, only few of them would, in effect, perform condition inspection of the ventilation systems on a regular basis. Improving the testing methods and the operating procedures involved would provide the solution to the problem.

In a word, the disadvantages of the conventional condition inspections of the ventilation system can be specified as follows: (1) the tester has to climb up and down a climbing device to take the measurement, which is taxing and needs improving in terms of accessibility; (2) the adjustment of the instruments involved and the way the measurement is performed require professionalism, a lot of which has to rely on the experience of the tester.

To overcome these problems, it is desirable to develop an air velocity sensing system not requiring external power supply, in an attempt to make easy the condition inspection of the ventilation system.

SUMMARY OF THE INVENTION

The objective of the present invention is to provide an air velocity sensing system not requiring external power supply, which is intended to simplify the condition inspection procedure for the ventilation system, so that companies or factories will be willing to conduct the inspection. Besides, the air velocity sensing system not requiring external power supply can make the condition inspection less complicated and require no experienced testers.

To achieve the preceding goal, the air velocity sensing system not requiring external power supply comprises: (1) a sensor module disposed in the air duct for measuring the air velocity therein and for saving the measured air velocity value; and (2) a control module for wirelessly transmitting a signal to the sensor module, which sends the measured air velocity value back to the control module after receiving the signal from the control module, so as to have the air velocity value displayed on control module.

The present invention also provides an air velocity sensing method not requiring external power supply, which comprises the steps of: (1) having a control module send a wireless signal to a sensor module; measuring air velocity in an air duct after the sensor module receives the signal; and (2) having the sensor module wirelessly transmit the measured air velocity back to the control module; and displaying the measured air velocity value on the control module.

Preferably, an exhaust fan is mounted in the air duct for drawing the air within the duct to generate air velocity, whereas a power harvest component incorporated into the sensor module generate power from the air flow in the air duct to supply power for the activation of the sensor module.

Preferably, the power harvest component comprises a set of fan blades and a coil, wherein: (1) the set of fan blades will be driven to turn through the air velocity generated by the exhaust fan; (2) the coil will further be induced to generate an alternating voltage by the turning of the set of fan blades; and (3) the sensor module will be used to measure the air velocity by converting the power, which is generated by the alternating voltages resulted from coil induction, into air velocity value, or by basing the air velocity value on the turning speed of the fan blades.

Preferably, the sensor module further comprises a rectifier element for converting the alternating voltage generated by the power harvest component into a stable direct voltage.

Preferably, the sensor module further comprises a power saving element for saving the direct voltage converted by the rectifier element and for supplying power to the sensor module.

Preferably, the power saving element is a super capacitor.

Preferably, the sensor module further comprises a processor for receiving and processing the transmitted signal from the control module and for sending the measured air velocity back to the control module.

Preferably, the wireless signal transmission between the sensor module and the control module can be carried out by RF transmission, infrared transmission, or microwave transmission.

Preferably, the control module comprises a display for displaying the air velocity value measured by the sensor module.

According to the present invention, the advantages of the air velocity sensing system not requiring external power supply can be specified as follows: (1) external power supply is not required; (2) signal lines are not required; (3) learning is not required, and it is easy to install and to operate; (4) it is low cost; (5) the condition of the airflow in the air duct system can be monitored and controlled at any time.

DETAILED DESCRIPTION OF THE PREFERRED EMBODIMENTS

With detailed description of the preferred embodiments of the present invention, those skilled in the art will readily appreciate that various modifications and changes can be applied to the embodiments of the invention as hereinbefore described without departing from its scope, defined in and by the appended claims. In addition, the embodiments should not be construed as a limitation on the implementation of applicable description of the invention.

Figure 1:
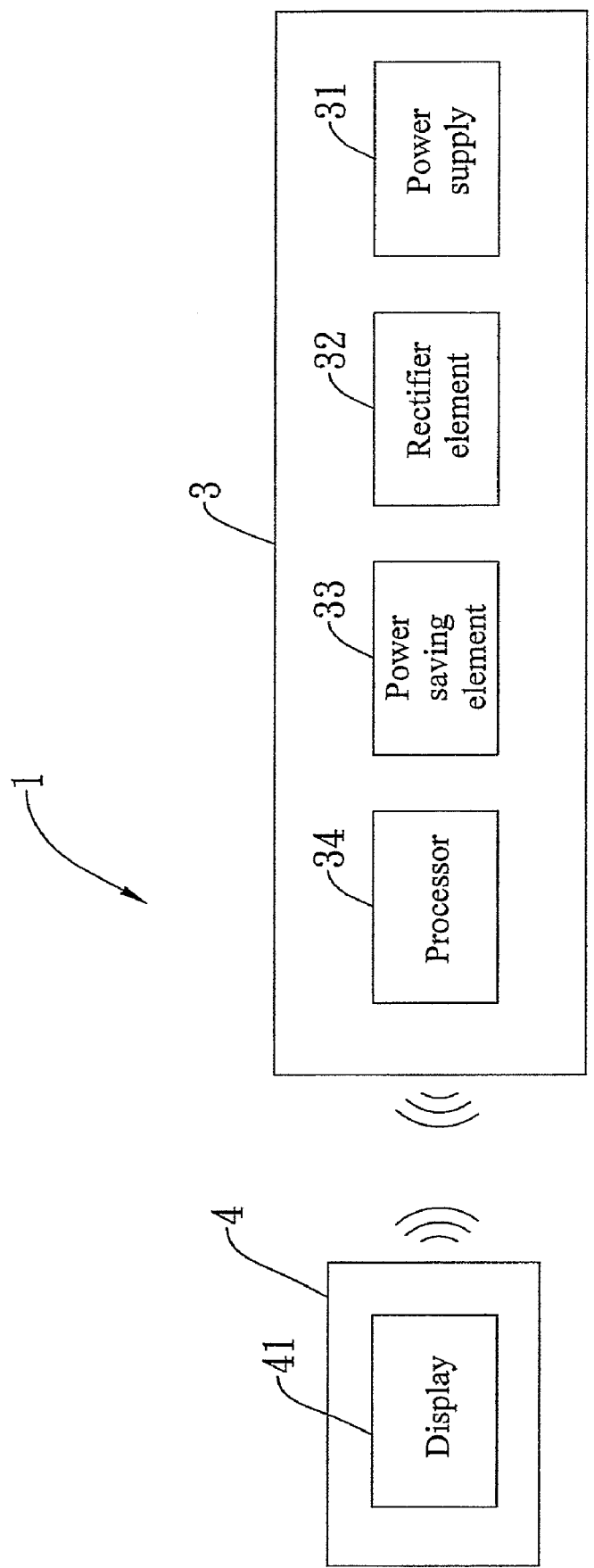
FIG. 1 shows a block diagram illustrating an air velocity sensing system not requiring external power supply, according to one preferred embodiment of the present invention.
Figure 2:
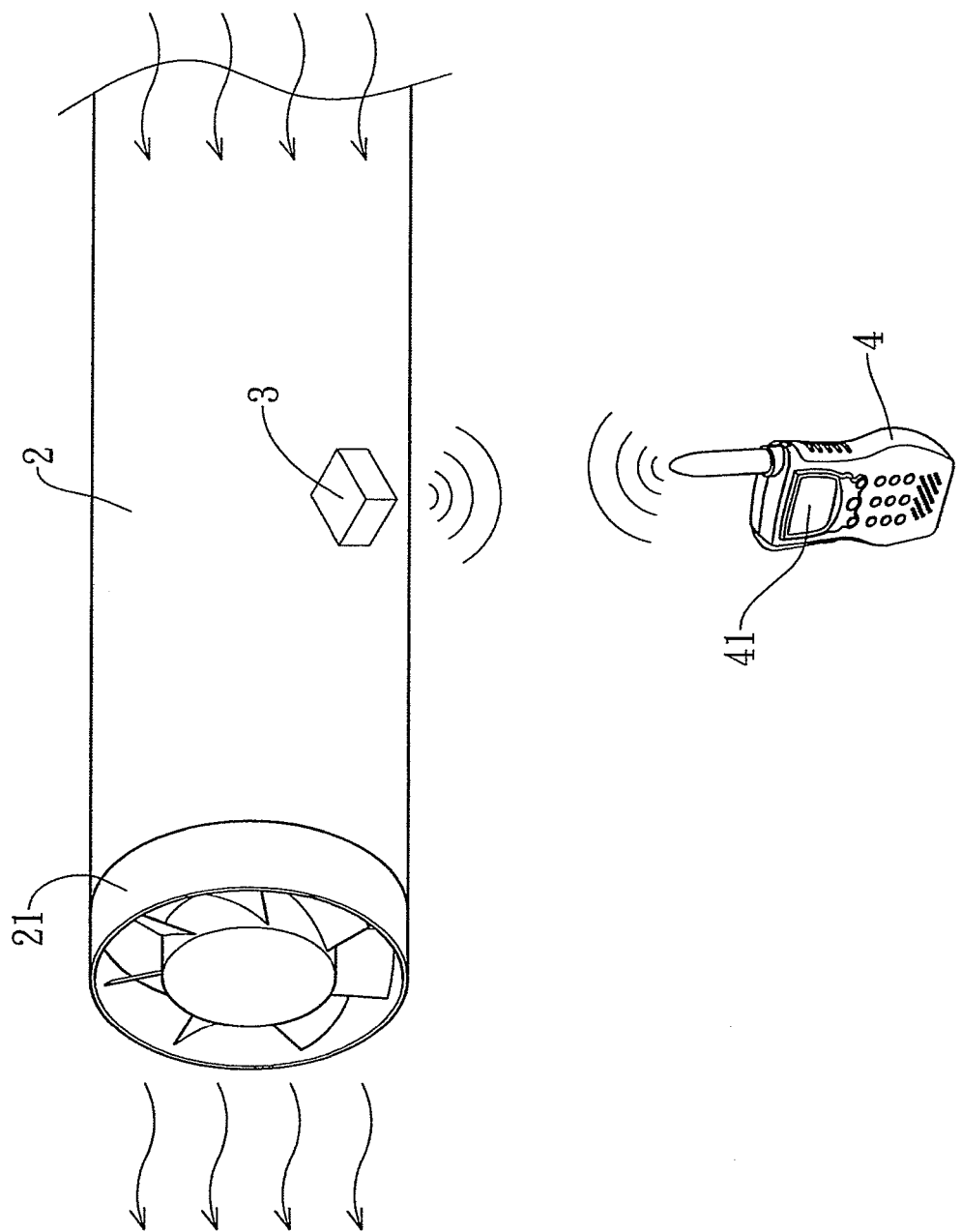
FIG. 2 shows a schematic view illustrating an air velocity sensing system applied to an air duct without requiring external power supply, according to one preferred embodiment of the present invention.

FIG. 1 and FIG. 2, respectively, show a block diagram illustrating an air velocity sensing system not requiring external power supply and a schematic view illustrating such system applied to an air duct, according to one preferred embodiment of the present invention. In such preferred embodiment of the present invention, an air velocity sensing system not requiring external power supply 1 is used in air duct systems 2, comprising: (1) a sensor module 3 containing a power harvest component 31, a rectifier element 32, a power saving element 33, and a processor 34, with the sensor module 3 being disposed in the air duct 2; and (2) a control module 4 wirelessly transmitting a signal to the sensor module 3 and receiving wireless signals transmitted back from the sensor module 3.

An exhaust fan 21 is mounted in the air duct for drawing the air within the duct to generate air velocity, whereas a power harvest component 31 is incorporated into the sensor module 3 that comprises a set of fan blades (not shown) and a coil (not shown), supplying power for the activation of the sensor module 3.

A rectifier element 32 in the sensor module 3 converts the alternating voltage generated by the power harvest component 31 into a stable direct voltage, whereas a power saving element 33 in the sensor module 3 saves the direct voltage converted by the rectifier element 32 and supplies power to the sensor module 3.

FIG. 2, referring back to FIG. 1, shows that a tester operates a control module 4 to wirelessly transmit a signal to the sensor module 3 whose processor 34 receives and processes the signal from the control module. Meanwhile, when the exhaust fan 21 draws the air within the duct to generate air velocity, the set of fan blades in the power harvest component 31 will be driven to turn, inducing the coil in the power harvest component 31 to generate an alternating voltage before power is generated. The power, through the processor 34, will be converted into an air velocity value, which, through the processor 34 again, is transmitted back to the control module 4 to be shown on the display 41 of the control module 4 for reading.

Alternatively, the air velocity value can also be determined by the turning speed of the fan blades before being transmitted back to the control module 4 through the processor 34. Such air velocity value will be shown on the display 41 of the control module 4 for reading.

Figure 3:
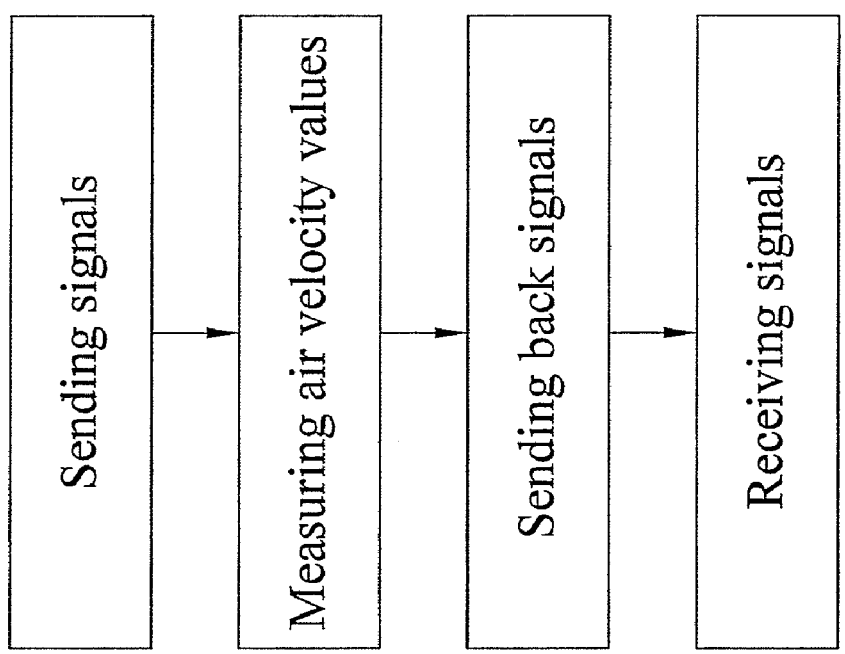
FIG. 3 shows an operation flow chart illustrating an air velocity sensing method not requiring external power supply, according to one preferred embodiment of the present invention.

FIG. 3, referring back to FIG. 1 and FIG. 2, shows an operation flow chart illustrating an air velocity sensing method not requiring external power supply, according to one preferred embodiment of the present invention. Such method comprises the following operating procedures:

Sending signals: to have a control module 4 send a wireless signal to a sensor module 3;

Measuring air velocity values: to measure air velocity in an air duct 2 through the sensor module 3 after whose processor 34 receives the wireless signal from the control module 4;

Sending back signals: to have the processor 34 of the sensor module 3 send the measured air velocity value back to the control module 4 through wireless transmission; and Receiving signals: to have the control module 4 receive the wireless signals sent back through the processor 34 of the sensor module 3, and to show the measured air velocity value on the display 41 of the control module 4

Figure 4:
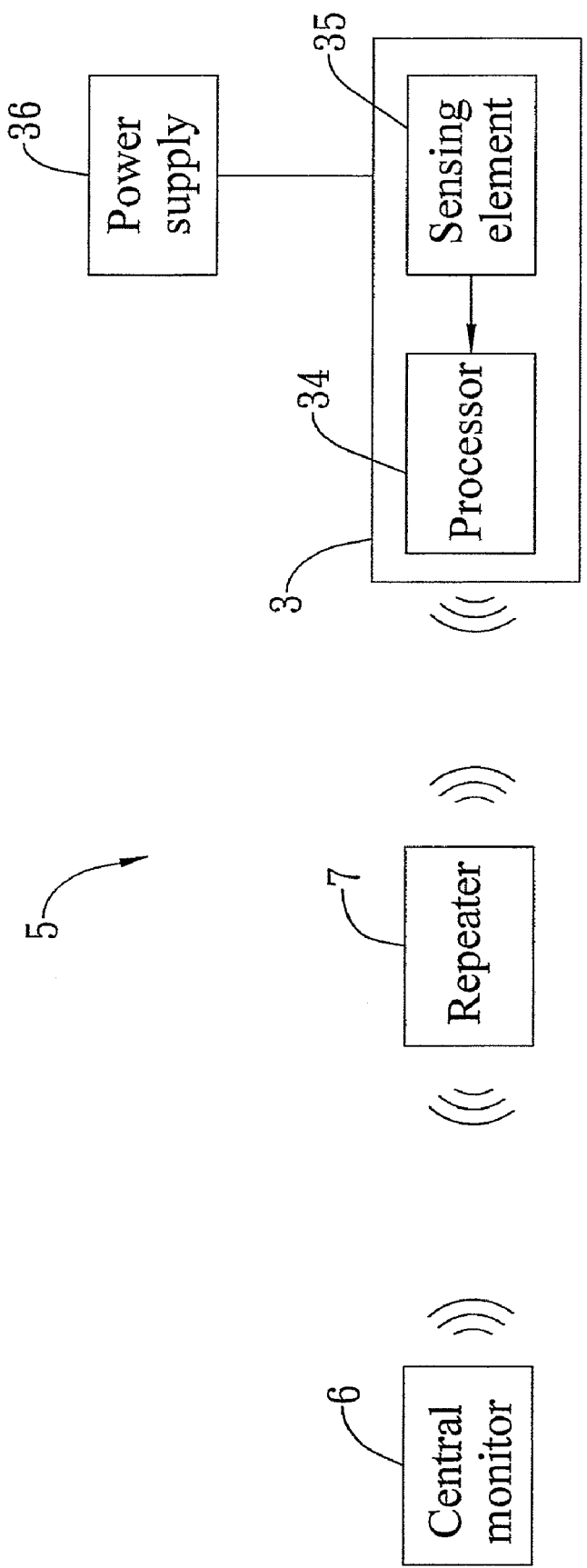
FIG. 4 shows a block diagram illustrating an air velocity sensing system not requiring external power supply, according to another preferred embodiment of the present invention.
Figure 5:
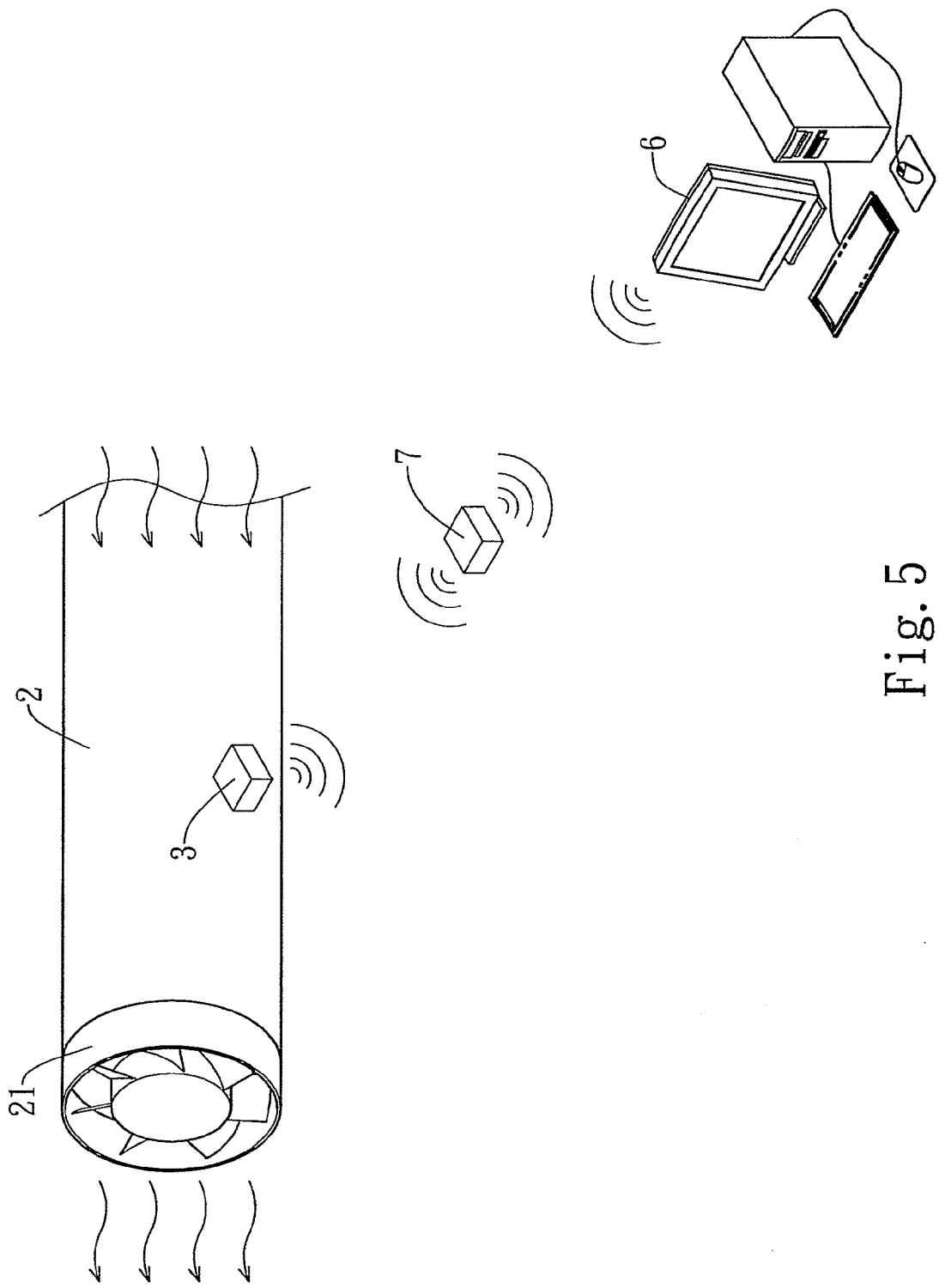
FIG. 5 shows a schematic view illustrating an air velocity sensing system not requiring external power supply that is applied to an air duct, according to another preferred embodiment of the present invention.
Figure 6:
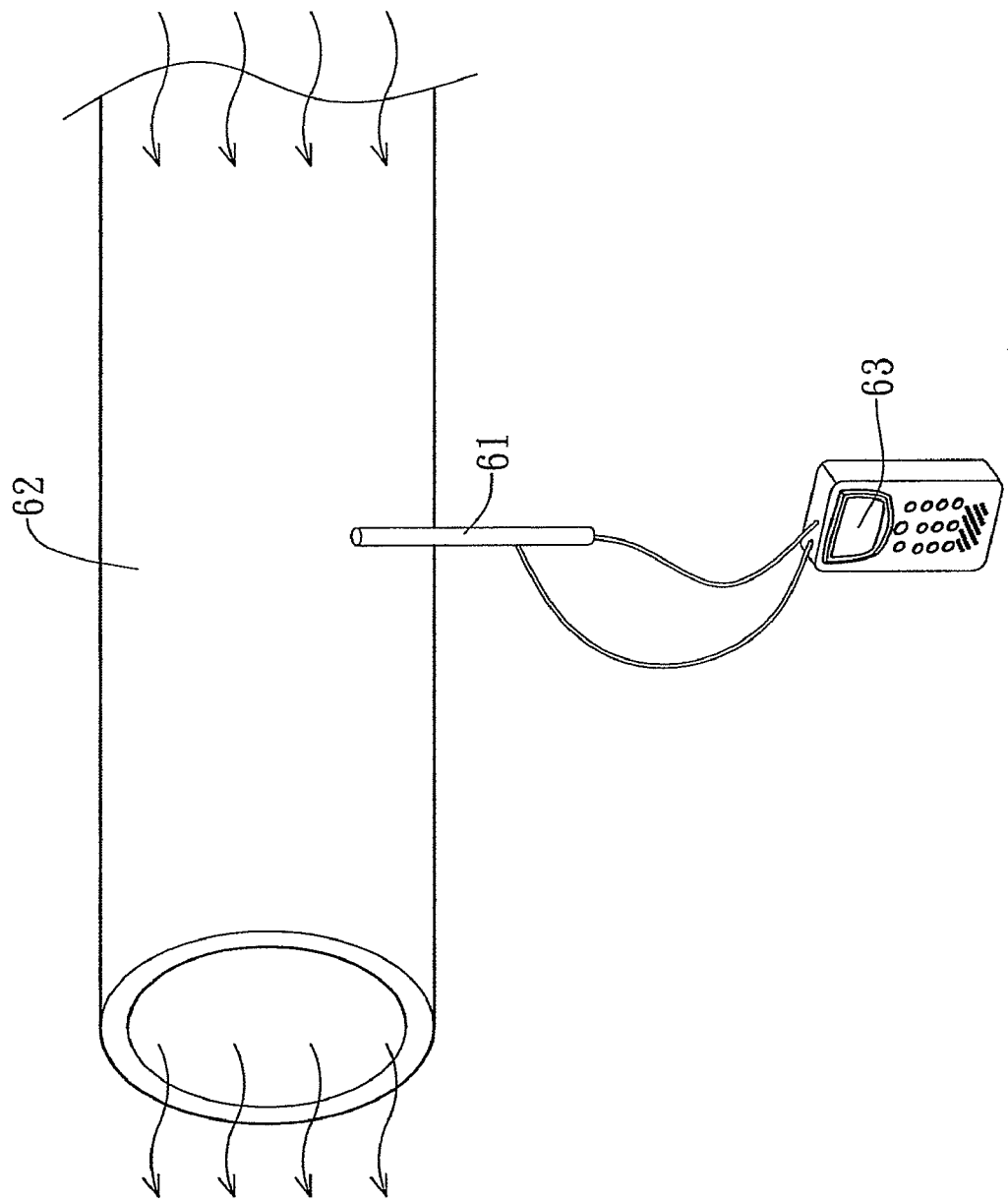
FIG. 6 shows a schematic view where air velocity is measured in an air duct.
Figure 7:
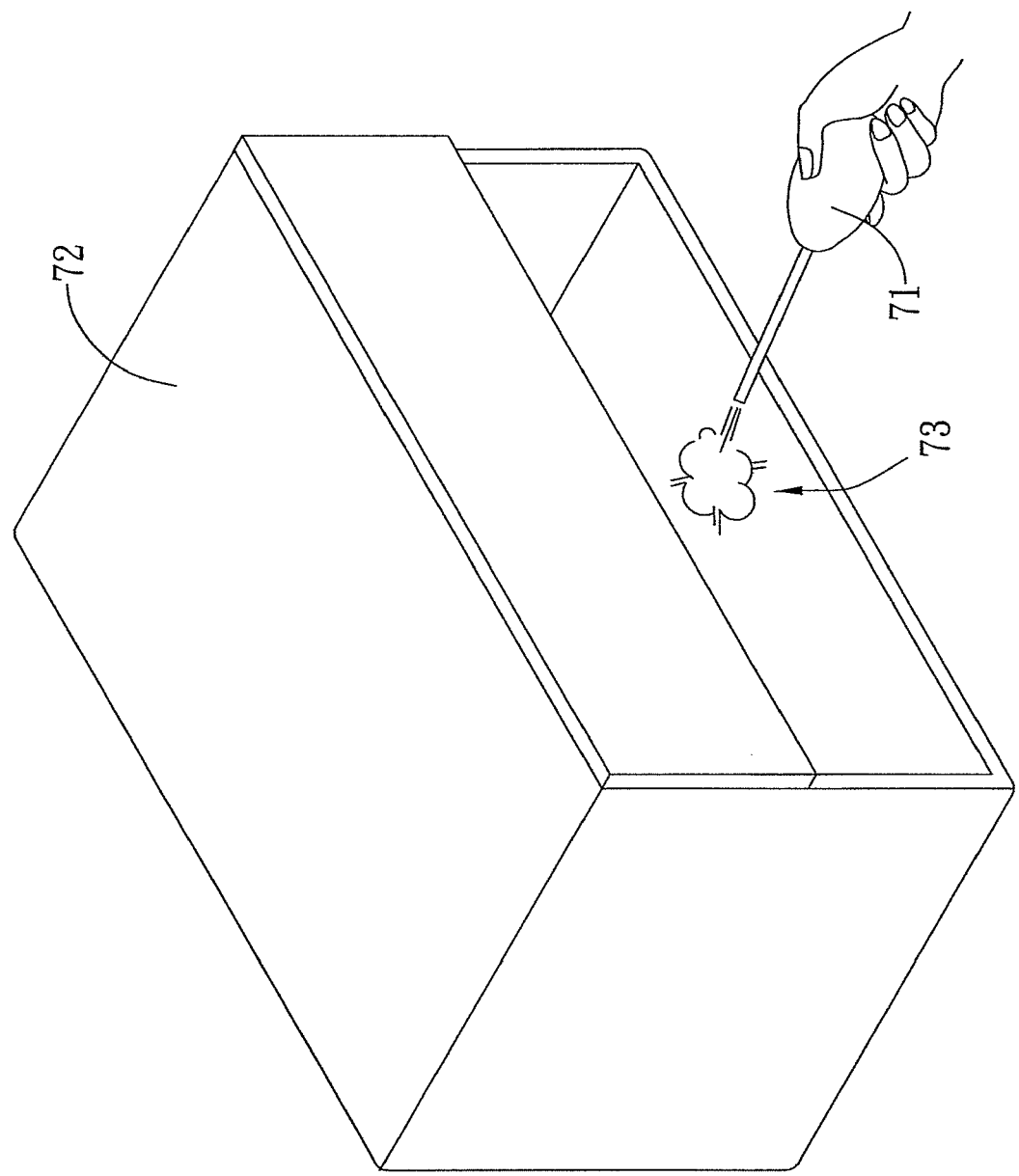
FIG. 7 shows a schematic view where a smoke tube is used to test the airflow in a fume hood.

FIG. 4 and FIG. 5, respectively, show a block diagram illustrating an air velocity sensing system not requiring external power supply and a schematic view illustrating such system applied to an air duct, according to another preferred embodiment of the present invention. In such preferred embodiment of the present invention, an air velocity sensing system not requiring external power supply 5 comprises: (1) at least a sensor module 3 and a central monitoring unit 6, wherein the sensor module 3 is mounted in an air duct 2 to measure air velocity within the duct, and to wirelessly transmit the measured air velocity value back to the central monitoring unit 6.

An exhaust fan 21 is mounted in the air duct 2 for drawing the air within the duct to generate air velocity. The sensor module 3 is provided with an external power supply 36, supplying power for the activation of the sensor module 3. Moreover, the sensor module 3 further comprises a processor 34 and a sensing element 35.

FIG. 5, referring back to FIG. 4, shows that the sensing element 35 in the sensor module 3 senses air velocity in the air duct 2 before the measured air velocity value is processed through the processor 34. The processor 34, further, will send the air velocity value to the central monitoring unit 6 for reading.

According to such preferred embodiment, the air velocity sensing system not requiring external power supply 5 further comprises at least a repeater 7 for enhancing the signal transmitted from the processor 34 of the sensor module 3 to the central monitoring unit 6, denoting the air velocity value The advantages of the air velocity sensing system not requiring external power supply can be specified as follows: (1) external power supply is not required; (2) signal lines are not required; (3) learning is not required, and it is easy to install and to operate; (4) it is low cost; (5) the condition of the airflow in the air duct system can be monitored and controlled at any time.

The preferred embodiments of the present invention have been disclosed in the examples. However the examples should not be construed as a limitation on the actual applicable scope of the invention, and as such, all modifications and alterations without departing from the spirits of the invention and appended claims, including the other embodiments shall remain within the protected scope and claims of the invention.

What is claimed is:

1. An air velocity sensing system not requiring external power supply is applied to an air duct system, comprising:
   a sensor module disposed in the air duct for measuring the air velocity therein and for saving the measured air velocity value;
   a power harvest component incorporated into the sensor module to supply power for the activation of the sensor module; and
   a control module for wirelessly transmitting a signal to the sensor module, which sends the measured air velocity value back to the control module after receiving the signal from the control module, so as to have the air velocity value displayed on control module.

2. An air velocity sensing system not requiring external power supply as claimed in claim 1, in which the power harvest component comprises a set of fan blades and a coil, wherein:
   a. the set of fan blades will be driven to turn through the air velocity generated by the exhaust fan mounted in the air duct for drawing the air within the duct to generate air velocity;
   b. the coil will be induced to generate an alternating voltage by the turning of the set of fan blades; and
   c. the sensor module will be used to measure the air velocity by converting the power, which is generated by the alternating voltages resulted from coil induction, into air velocity value, or by basing the air velocity value on the turning speed of the fan blades.

3. An air velocity sensing system not requiring external power supply as claimed in claim 1, wherein the sensor module further comprises a rectifier element for converting the alternating voltage generated by the power harvest component into a stable direct voltage.

4. An air velocity sensing system not requiring external power supply as claimed in claim 3, wherein the sensor module further comprises a power saving element for saving the direct voltage converted by the rectifier element and for supplying power to the sensor module.

5. An air velocity sensing system not requiring external power supply as claimed in claim 4, wherein the power saving element is a super capacitor.

6. An air velocity sensing system not requiring external power supply as claimed in claim 1, wherein the sensor module further comprises a processor for receiving and processing the transmitted signal from the control module and for sending the measured air velocity back to the control module.

7. An air velocity sensing system not requiring external power supply as claimed in claim 1, wherein the wireless signal transmission between the sensor module and the control module can be carried out by RF transmission, infrared transmission, or microwave transmission.

8. An air velocity sensing system not requiring external power supply as claimed in claim 1, wherein the control module comprises a display for displaying the air velocity value measured by the sensor module.

9. An air velocity sensing method not requiring external power supply, comprising the steps of:
   a. having a power harvest component generate power from the air flow in the air duct to supply power for the activation of the sensor module
   b. having a control module send a wireless signal to the sensor module; measuring air velocity in the air duct after the sensor module receives the signal; and
   c. having the sensor module wirelessly transmit the measured air velocity back to the control module; and displaying the measured air velocity value on the control module.

10. An air velocity sensing method not requiring external power supply as claimed in claim 9, in which the power harvest component comprises a set of fan blades and a coil, wherein:
   a. the set of fan blades will be driven to turn through the air velocity generated by the exhaust fan mounted in the air duct for drawing the air within the duct to generate air velocity;
   b. the coil will be induced to generate an alternating voltage by the turning of the set of fan blades; and
   c. the sensor module will be used to measure the air velocity by converting the power, which is generated by the alternating voltages resulted from coil induction, into air velocity value, or by basing the air velocity value on the turning speed of the fan blades.

11. An air velocity sensing method not requiring external power supply as claimed in claim 9, wherein the sensor module further comprises a rectifier element for converting the alternating voltage generated by the power supply into a stable direct voltage.

12. An air velocity sensing method not requiring external power supply as claimed in claim 11, wherein the sensor module further comprises a power saving element for saving the direct voltage converted by the rectifier element and for supplying power to the sensor module.

13. An air velocity sensing method not requiring external power supply as claimed in claim 12, wherein the power saving element is a super capacitor.

14. An air velocity sensing method not requiring external power supply as claimed in claim 9, wherein the sensor module further comprises a processor for receiving and processing the transmitted signal from the control module and for sending the measured air velocity back to the control module.

15. An air velocity sensing method not requiring external power supply as claimed in claim 9, wherein the wireless signal transmission between the sensor module and the control module can be carried out by RF transmission, infrared transmission, or microwave transmission.

16. An air velocity sensing method not requiring external power supply as claimed in claim 9, wherein the control module comprises a display for displaying the air velocity value measured by the sensor module.

17. An air velocity sensing system not requiring external power supply, comprising at least a sensor module, a power harvest component and a central monitoring unit, wherein the power harvest component is incorporated into the sensor module to generate power from the air flow in an air duct and supply the power for the activation of the sensor module, and the sensor module is used to measure air velocity in the air duct and to wirelessly transmit the measured air velocity back to the central monitoring unit.

18. An air velocity sensing system not requiring external power supply as claimed in claim 17, wherein an exhaust fan is mounted in the air duct for drawing the air within the duct to generate air velocity.

19. An air velocity sensing system not requiring external power supply as claimed in claim 17, wherein the sensor module further comprises a sensing element for sensing the air velocity in the air duct.

20. An air velocity sensing system not requiring external power supply as claimed in claim 17, wherein the sensor module further comprises a processor for processing the air velocity value measured by the sensor module and for sending the measured air velocity value to the central monitoring unit.

21. An air velocity sensing system not requiring external power supply as claimed in claim 17, wherein the wireless signal transmission between the sensor module and the central monitoring unit can be carried out by RF transmission, infrared transmission, or microwave transmission.

22. An air velocity sensing system not requiring external power supply as claimed in claim 17, further comprising at least a repeater for enhancing the signal transmitted from the sensor module to the central monitoring unit, denoting the air velocity value.

23. An air velocity sensing system not requiring external power supply as claimed in claim 17, wherein the sensor module is provided with an external power supply, supplying power for the activation of the sensor module.

* * * * *